United States Patent [19]

Hayes

[11] Patent Number: 5,058,414

[45] Date of Patent: Oct. 22, 1991

[54] ELECTRICAL KNOCK-OUT METHOD AND TOOL

[76] Inventor: Fred M. Hayes, 106 Nedra Ave., Steubenville, Ohio 43952

[21] Appl. No.: 588,061

[22] Filed: Sep. 25, 1990

[51] Int. Cl.⁵ .................. B21D 53/00; B21D 5/00
[52] U.S. Cl. .................. 72/379.2; 72/387; 72/409; 29/764; 29/268; 81/426; 220/266
[58] Field of Search ............. 72/409, 389, 387, 386, 72/379.2; 29/268, 426.4, 426.5, 762, 764; 7/126; 81/418, 419, 424.5, 426.5, 426; 220/266

[56] References Cited

U.S. PATENT DOCUMENTS

| 895,441 | 8/1908 | Dorff | 220/266 |
|---|---|---|---|
| 1,154,718 | 9/1915 | Neff | 29/268 |
| 1,316,409 | 9/1919 | Bahre | 81/426 |
| 1,435,150 | 11/1922 | Carpenter | 81/426 |
| 1,678,313 | 7/1928 | Atkinson | 29/268 |
| 1,746,016 | 2/1930 | Shiffman | 29/268 |
| 2,301,079 | 11/1942 | Phipps | 72/387 |
| 4,787,139 | 11/1988 | Sweet | 29/764 |
| 4,825,339 | 4/1989 | Boudon | 220/266 |

FOREIGN PATENT DOCUMENTS 2275127 1/1976 France ..................... 29/268

Primary Examiner—Daniel C. Crane
Attorney, Agent, or Firm—Renner, Otto, Boisselle & Sklar

[57] ABSTRACT

A method of removing electrical box knock-outs which includes utilizing a hand tool which has elongated jaws, one with a ring and the other with a punch directed toward the center of the ring. By positioning the jaws on opposite sides of a box wall and closing the jaws, the punch and ring close on the knock-out and the punch deflects the knock-out through the ring so that the knock-out can then be twisted and removed by needle nose pliers, for example.

18 Claims, 1 Drawing Sheet

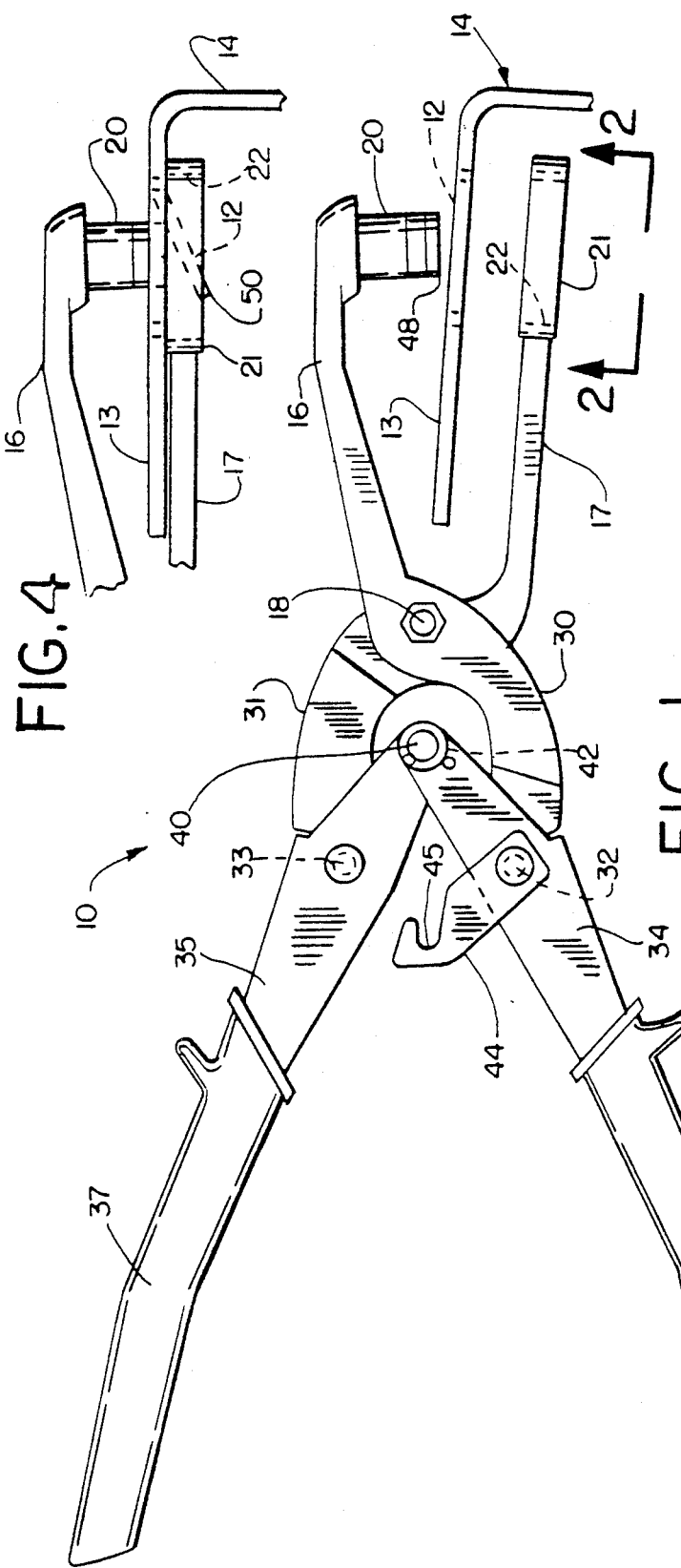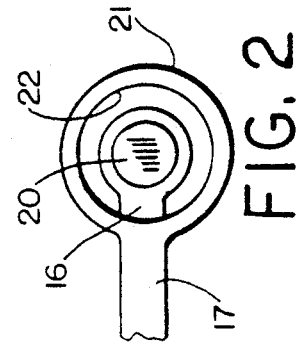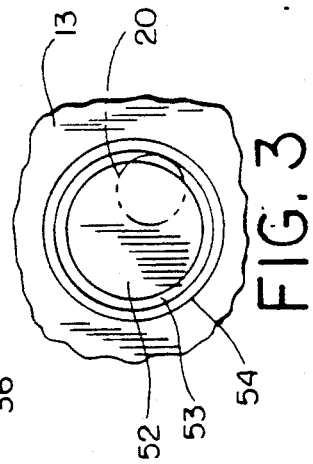

ELECTRICAL KNOCK-OUT METHOD AND TOOL

DISCLOSURE

This invention relates generally as indicated a method of removing electrical box knock-outs and a tool for such purpose.

BACKGROUND OF THE INVENTION

Electrical enclosures include in the walls knock-outs which have a center and may include one or more concentric rings which must be removed for the passage of wiring or conduit. The usual practice is to remove the selected knock-out before the enclosure is installed and before wiring or fixtures are installed. This isn't always possible.

To remove the knock-out, it is usually struck with an implement such as a screwdriver, in turn struck by a hammer. When the knock-out is deflected it is then grasped by needle nose pliers and twisted out. If the box is already installed the process can result in damage or distortion to the enclosure or the bracketry on which it is mounted. In other words the box may be knocked loose or out of line. If the box already contains wiring or a wired fixture there is also a clearance problem and the process may result in damage to the wiring or fixture in place. If proper precautions aren't taken the hot wires also present a further safety problem. Skinned knuckles are not uncommon in the above described process as well as the noted damage to the box, fixture, wiring or mounting bracketry. The process is also time consuming.

Accordingly, there is a need for a convenient tool which will enable the knock-outs more readily to be removed.

A prior art search has revealed special knock-out tools in U.S. Pat. Nos. 3,713,200 and 4,167,058, both of which require to be struck or hammered to obtain the force to deflect the knock-out. The search also revealed a variety of plier type tools such as U.S. Pat. Nos. 4,787,139; 4,881,434; 4,170,125; 2,154,580; 4,075,749; and 4,149,435, for a variety of purposes, the latter U.S. Pat. No. 4,149,435 being for the purpose of removing identification slugs from the heads of keys.

SUMMARY OF THE INVENTION

A method of removing electrical box knock-outs which includes utilizing a hand tool which has elongated jaws, one with a ring and the other with a punch directed toward the center of the ring. By positioning the jaws on opposite sides of a box wall and closing the jaws, the punch and ring close on the knock-out and the punch deflects the knock-out through the ring so that the knock-out can then be twisted and removed by needle nose pliers.

The ring is preferably larger than the knock-out and the punch is smaller than the internal diameter of the ring and preferably about half that size. The tip of the punch may be designed to deflect the knock-out away from the wall on the side corresponding to the open face of the box. The punch may be lined up with a selected concentric ring edge to deflect and remove the ring. The tool may also be used to straighten inadvertently deflected rings or knock-outs. The tool is convenient to carry, may be operated with a single hand and saves significant time and aggravation in the wiring process.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a side elevation of a tool position vis-a-vis a box wall and knock-out in accordance with the present invention;

FIG. 2 is a fragmentary view of the ring and punch as seen from the line 2—2 of FIG. 1, but with the box wall removed;

FIG. 3 is a view showing how the punch may selectively remove a concentric ring; and FIG. 4 is a fragmentary view of the jaws similar to FIG. 1 showing the punch deflecting the knock-out through the ring.

DETAILED DESCRIPTION OF THE PREFERRED EMBODIMENTS

Referring first to FIG. 1 there is illustrated a tool shown generally at 10 used to facilitate the removal of knock-outs 12 in the walls 13 of sheet metal enclosures 14 such as electrical boxes.

The tool comprises a pair of elongated jaws 16 and 17 which are pivotally connected at jaw pivot 18. The distal or outer ends of the jaws are provided with a blunt punch 20 and a ring 21, respectively. The ring is circular and has an internal diamter 22 which is larger than the diameter of the knock-out 12. The punch is directed toward the center of the ring and as illustrated more clearly perhaps in FIG. 2 has a diameter approximately half the internal diameter 22 of the ring. The jaw 17 is fairly straight as it extends from the ring 21 lying in the same plane as the ring. The ring, being fairly narrow in axial width together with the jaw supporting it may thus be positioned flush against the interior of the closure wall as seen in FIG. 4. If there is wiring or a fixture inside the enclosure the narrow profile of the jaw and ring enable the tool to be inserted into the enclosure without interference with either a fixture or wiring already in the enclosure.

From the pivot 18 the jaws extend in the curved fashion illustrated at 30 and 31 to be pivoted at 32 and 33, respectively, to handles 34 and 35. The handles are provided with plastic covers 36 and 37, respectively. The handles are pivoted together at a center pivot 40 positioned between the pivots 32 and 33 on the handles and the pivot 18 between the respective jaws. A coil spring 42 surrounds the pivot 40 and is connected to the respective handles to urge the handles to an open position as seen at FIG. 1, and also the jaws. The tool may be locked in its closed position by a locking link 44 pivoted to the pivot 32 and provided with a hook notch 45 adapted to engage the pivot 33. In this manner the tool may be kept closed for convenience of carrying in a pocket or pouch.

It can readily be seen that the tool is designed so that the jaws straddle the enclosure wall 13 and that hand pressure on the handles will cause the jaws to close moving the punch 20 toward the center of the ring 21.

When the ring is positioned on the inside of the enclosure wall at the knock-out, the closing of the handles drives the punch 20 against the exterior of the knock-out. The punch may be designed or angled so that the corner indicated at 48 in FIG. 1 engages the knock-out first causing the knock-out to deflect through the internal diameter of the ring as seen in FIG. 4. With the knock-out thus deflected, the deflected edge indicated at 50 in FIG. 4 is readily positioned toward the open side of the enclosure so that it can be grasped by the tip of needle nose pliers for twisting and removal.

In FIG. 3 there is illustrated a knock-out which includes a center hole 52, a middle ring 53 and an outer ring 54. The center hole knock-out is removed first with the ring 21 being somewhat larger in its internal diameter than the diameter of the center hole 52. The diameter of the ring 21 ensures that only the center hole will be removed. Then, to remove, for example, the middle ring 53 the punch 20 is positioned so that it is tangent with the inside diameter of the outer ring 54 or the outside diameter of the middle ring 53. By driving the punch through the ring the middle ring 53 is deflected and then can readily be removed with the jaws of a needle nose pliers.

It will also be appreciated that the punch and ring of the tool of the present invention may be used to straighten any bent knock-out or rings if, for example, the electrician changes his mind. The tip of the punch is simply placed on the projecting edge of the deflected knock-out or ring and the closing of the punch onto the ring drives the deflected portion of the knock-out or ring back into position.

It can now be seen that there is provided a hand tool which is small enough to be carried around in a pouch or pocket and which can be utilized in boxes or enclosures already mounted or even wired to facilitate the removal of the knock-outs or knock-out rings. With the tool and process of the present invention knock-outs can be removed in boxes of substantial depth and the tool and process avoids hitting the box with an implement such as a hammer or screwdriver and the problems attendant therewith. The tool and process of the present invention also avoids skinned knuckles and other aggravations. More importantly it saves time in the wiring process.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of removing electrical knock-outs from electrical box walls comprising the steps of placing a ring on one side of the electrical box in surrounding relationship to the electrical knock-out and a punch on the other side of the box wall in opposition to the knock-out, driving the punch and ring toward each other by single-hand gripping action to engage the box wall engaging the knock-out and deflecting the knock-out through the ring whereby the knock-out may be grasped by a pair of pliers.

2. A method as set forth in claim 1 wherein the punch and ring are driven toward each other by single hand grippings action.

3. A method as set forth in claim 2 wherein said ring has an opening larger than the knock-out.

4. A method as set forth in claim 3 wherein the tip of the punch is approximately half the diameter of the knock-out.

5. A method as set forth in claim 1 wherein said punch and ring are mounted on the jaws of a plier type hand tool.

6. A method as set forth in claim 1 including the step of positioning said ring on the inside of the box.

7. A method of straightening deflected electrical knock-outs in electrical box walls comprising the steps of placing a ring on one side of the electrical box in surrounding relationship to the electrical knock-out and a punch on the other side of the box wall in opposition to the knock-out, causing the ring to engage the electrical box wall and the punch to engage the deflection by single-hand gripping action and driving the punch toward the ring to straighten the deflection.

8. A method as set forth in claim 7 wherein the punch and ring are driven toward each other by single-hand gripping action.

9. A method as set forth in claim 8 wherein said ring has an opening larger than the knock-out.

10. A method as set forth in claim 9 wherein the tip of the punch is approximately half the diameter of the knock-out.

11. A method as set forth in claim 7 wherein said punch and ring are mounted on the jaws of a plier type hand tool.

12. A tool for removing or straightening electrical box wall knock-outs within electrical box walls comprising a pair of elongated pivotal jaws, one terminating in a continuous ring having an internal diameter sized to engage an electrical box wall and surround the electrical box wall knock-out and the other in a blunt punch of substantially lesser diameter than the ring directed toward the center of the ring, said punch and ring being positioned on said jaws at a distance from the pivot so that the punch or ring can be positioned within the electrical box walls in operative orientation with the electrical box knock-out, handle means operable by a single hand to open and close said jaws wherein said jaws may, when opened, be positioned on opposite sides of the wall, aligned with the knock-out, and driven toward each other to deflect the knock-out through the ring.

13. A tool as set forth in claim 12 including spring means to open the jaws.

14. A tool as set forth in claim 12 including lock means to hold said jaws closed whereby the tool may conveniently be placed in a pouch or pocket.

15. A tool as set forth in claim 12 wherein said ring has an internal diameter larger than the knock-out.

16. A tool as set forth in claim 12 wherein said punch has a diameter about half the internal diameter of the ring.

17. A tool as set forth in claim 12 wherein the tip of the punch and the ring are at a slight angle when the jaws close on the box wall and knock-out to deflect the side of the knock-out toward the open end of the box.

18. A tool set forth in claim 12 wherein said handle means may be squeezed with one hand to close said jaws.

* * * * *